United States Patent
Hayashi

(10) Patent No.: US 11,043,119 B2
(45) Date of Patent: Jun. 22, 2021

(54) IMAGING SYSTEM, IMAGING METHOD, AND IMAGING CONTROL PROGRAM

(71) Applicant: NEC Corporation, Tokyo (JP)

(72) Inventor: Haruyuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/498,817

(22) PCT Filed: Oct. 13, 2017

(86) PCT No.: PCT/JP2017/037138
§ 371 (c)(1),
(2) Date: Sep. 27, 2019

(87) PCT Pub. No.: WO2018/179534
PCT Pub. Date: Oct. 4, 2018

(65) Prior Publication Data
US 2020/0043327 A1 Feb. 6, 2020

(30) Foreign Application Priority Data
Mar. 30, 2017 (JP) .............................. JP2017-066567

(51) Int. Cl.
*G08G 1/04* (2006.01)
*G03B 15/04* (2021.01)
(Continued)

(52) U.S. Cl.
CPC ............... *G08G 1/04* (2013.01); *G03B 15/04* (2013.01); *G08G 1/015* (2013.01); *H04N 5/225* (2013.01); *G06K 9/00832* (2013.01)

(58) Field of Classification Search
CPC ............ G08G 1/04; G08G 1/01; G08G 1/015; G08G 1/00; G03B 15/00; G03B 15/02;
(Continued)

(56) References Cited

U.S. PATENT DOCUMENTS

| 5,392,034 A | * | 2/1995 | Kuwagaki | ............... | G08G 1/015 340/933 |
| 2005/0231633 A1 | * | 10/2005 | Yuyama | ............... | H04N 5/2256 348/370 |

(Continued)

FOREIGN PATENT DOCUMENTS

| JP | H05-225490 A | 9/1993 |
| JP | 2002-152560 A | 5/2002 |

(Continued)

OTHER PUBLICATIONS

International Search Report for PCT/JP2017/037138, dated Jan. 16, 2018.

(Continued)

*Primary Examiner* — Daquan Zhao
(74) *Attorney, Agent, or Firm* — Sughrue Mion, PLLC

(57) ABSTRACT

Provided is an imaging system capable of acquiring images that favorably show the situation in a mobile object seen through a window regardless of the height of a passing mobile object. The imaging device 3 images a mobile object. The first lighting device 1 irradiates the mobile object with light. The second lighting device 2 is installed at a position higher than the first lighting device 1 and irradiates the mobile object with light. The control unit 4 causes the first lighting device 1 and the second lighting device 2 to emit light in respective patterns while the imaging device 3 is imaging a mobile object over a plurality of frames. The selector 5 selects images acquired by imaging a mobile object irradiated with light in a preset manner depending on the height of the mobile object from among images for a plurality of frames.

5 Claims, 11 Drawing Sheets

(51) Int. Cl.
  *G08G 1/01* (2006.01)
  *G08G 1/015* (2006.01)
  *H04N 5/225* (2006.01)
  *H04N 9/47* (2006.01)
  *A61B 1/04* (2006.01)
  *G06K 9/00* (2006.01)

(58) Field of Classification Search
  CPC .... G03B 15/04; G06K 9/00832; H04N 5/225; H04N 5/2354; H04N 9/47; H05B 33/0854; A61B 1/04
  USPC .......... 348/148, 56, 61, 73, 74, 42; 315/153; 340/19, 933, 937
  See application file for complete search history.

(56) References Cited

U.S. PATENT DOCUMENTS

| | | | | |
|---|---|---|---|---|
| 2011/0001807 A1* | 1/2011 | Myokan | ............... | H04N 13/341 348/56 |
| 2012/0105496 A1* | 5/2012 | Komiya | ............... | G09G 3/3233 345/690 |
| 2014/0267702 A1* | 9/2014 | Profitt | ............... | G01B 11/25 348/136 |
| 2014/0320023 A1* | 10/2014 | Cannon | ............... | H05B 45/10 315/153 |
| 2015/0278617 A1 | 10/2015 | Oami | | |

FOREIGN PATENT DOCUMENTS

| | | |
|---|---|---|
| JP | 2009-140016 A | 6/2009 |
| JP | 2010-066986 A | 3/2010 |
| WO | 2014/064898 A1 | 5/2014 |
| WO | 2014/176398 A1 | 10/2014 |

OTHER PUBLICATIONS

Extended European Report dated Feb. 10, 2020 from European Patent Office in Application No. 17903653.8.
Japanese Office Action for JP Application No. 2019-508529 dated May 11, 2021 with English Translation.

* cited by examiner

FIG. 3
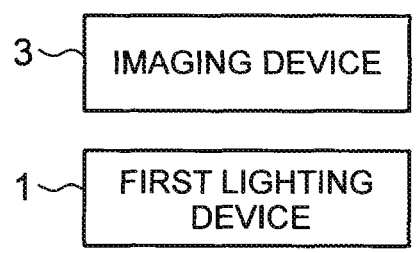
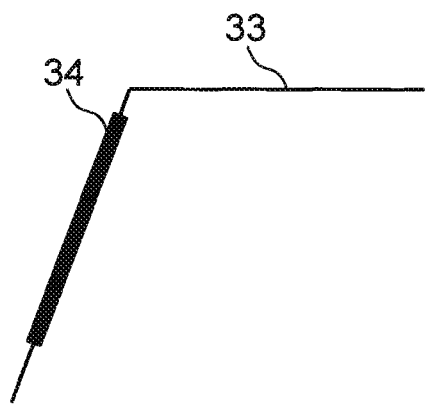
FIG. 4
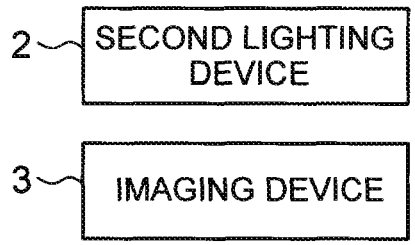
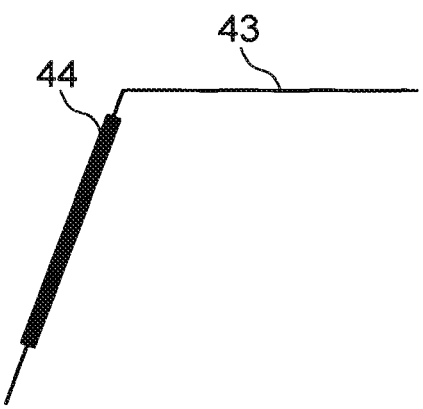

SECOND LIGHTING
DEVICE

FIRST LIGHTING
DEVICE 1  2  3  4  5  6  7  8  ⋯

FRAME

IMAGING SYSTEM, IMAGING METHOD, AND IMAGING CONTROL PROGRAM

CROSS REFERENCE TO RELATED APPLICATIONS

This application is a National Stage of International Application No. PCT/JP2017/037138 filed Oct. 13, 2017, claiming priority based on Japanese Patent Application No. 2017-066567 filed Mar. 30, 2017, the entire disclosure of which is incorporated herein.

TECHNICAL FIELD

The present invention relates to an imaging system, an imaging method, and an imaging control program used for imaging a mobile object.

BACKGROUND ART

PTL 1 describes an example of a system configured to image a mobile object. The system described in PTL 1 images a vehicle running on a lane with a camera unit provided with a lighting unit.

CITATION LIST

Patent Literature

PTL 1: Japanese Patent Application Laid-Open No. 2010-66986

SUMMARY OF INVENTION

Technical Problem

The following description will explain a case where the mobile object is a vehicle as an example in order to simplify the description. With the aim of checking the situation in the vehicle, a running vehicle is sometimes imaged from a side of the vehicle. In such a case, it is necessary to emit light toward a window at a side surface of the vehicle at the time of imaging in order to acquire an image that favorably shows the inside of the vehicle. Then, when imaging a vehicle from a side of the vehicle, it is conceivable to image the vehicle using a camera unit provided with a lighting unit described in PTL 1.

Nevertheless, the fact that the camera unit is provided with the lighting unit means that the camera and the lighting unit are close to each other. In this case, reflected glare of light occurs at a window part of the vehicle in the image acquired by imaging. Reflected glare of light means that light reflected at an object is shown in an image.

FIG. 17 is a schematic diagram illustrating a situation in which reflected glare of light occurs since the imaging device and the lighting device are close to each other. FIG. 17 schematically illustrates only a part of the vehicle as the vehicle. Moreover, assume that a vehicle 101 illustrated in FIG. 17 is a vehicle, such as a general passenger car, having a small vehicle height. Generally, a window 102 at a side surface of the vehicle 101 is provided obliquely (see FIG. 17). Therefore, in a case where an imaging device 111 and a lighting device 112 are close to each other as illustrated in FIG. 17, light emitted by the lighting device 112 is reflected at the obliquely provided window 102, and the reflected light is included in the angle of view of the imaging device 111. Then, an image in which reflected glare of light occurs in the window part is generated.

In an image in which reflected glare of light occurs on the window part, it becomes difficult to grasp the situation inside the vehicle.

In order to prevent reflected glare of light, it is conceivable to place the lighting device 112 at a position slightly lower than the imaging device 111. Then, the reflected light which is emitted by the lighting device 112 and reflected at the obliquely provided window 102 deviates from the angle of view of the imaging device 111, and reflected glare of light can be prevented.

Nevertheless, in that case, it becomes difficult to image the inside of a vehicle, such as a large van, having a large vehicle height. This is because light emitted by the lighting device 112 cannot reach the window at a side surface of the vehicle having a large vehicle height when the installation position of the lighting device 112 is lowered.

It is to be noted that the imaging device 111 and the lighting device 112 are placed in a side area of the road where various equipment can be placed. This equipment installable area is sometimes called as an island. In a case where the mobile object is a vehicle, the above problem is likely to occur when imaging a vehicle passing on a lane closest to the equipment installable area.

Moreover, even in a case where the mobile object is a ship or the like, a similar problem may occur when imaging the mobile object travelling near the imaging device 111 or the lighting device 112.

Now, an object of the present invention is to provide an imaging system, an imaging method, and an imaging control program capable of acquiring images that favorably show the situation in the mobile object seen through a window regardless of the height of the passing mobile object.

Solution to Problem

An imaging system according to the present invention is characterized by including: an imaging device that images a mobile object; a first lighting device that irradiates the mobile object with light; a second lighting device that is placed at a position higher than the first lighting device and irradiates the mobile object with light; a control unit configured to cause the first lighting device and the second lighting device to emit light in respective patterns while the imaging device is imaging the mobile object over a plurality of frames; and a selector configured to select images acquired by imaging a mobile object irradiated with light in a preset manner depending on the height of the mobile object from among images for a plurality of frames.

Moreover, an imaging system according to the present invention is characterized by including: an imaging device that images a mobile object; a first lighting device that irradiates the mobile object with light; a second lighting device that is placed at a position higher than the first lighting device and irradiates the mobile object with light; a specifying unit that specifies the height of the mobile object on the basis of a signal from a sensor for detecting the mobile object before the imaging device starts imaging the mobile object; and a control unit that controls the first lighting device and the second lighting device to emit light in a preset manner depending on the specified height while the imaging device is imaging the mobile object over a plurality of frames.

Moreover, an imaging method according to the present invention is an imaging method using an imaging device that images a mobile object, a first lighting device that irradiates the mobile object with light, and a second lighting device that is placed at a position higher than the first lighting device and irradiates the mobile object with light, the imaging method, by a computer, including: causing the first lighting device and the second lighting device to emit light in respective patterns while the imaging device is imaging the mobile object over a plurality of frames; and selecting images acquired by imaging a mobile object irradiated with light in a preset manner depending on the height of the mobile object from among images for a plurality of frames.

Moreover, an imaging method according to the present invention is an imaging method using an imaging device that images a mobile object, a first lighting device that irradiates the mobile object with light, and a second lighting device that is placed at a position higher than the first irradiation device and irradiates the mobile object with light, the imaging method, by a computer, including: specifying the height of the mobile object on the basis of a signal from a sensor for detecting the mobile object before the imaging device starts imaging the mobile object; and controlling the first lighting device and the second lighting device to emit light in a preset manner depending on the specified height while the imaging device is imaging the mobile object over a plurality of frames.

Moreover, an imaging control program according to the present invention is an imaging control program which is mounted in a computer connected with an imaging device that images a mobile object, with a first lighting device that irradiates the mobile object with light, and with a second lighting device that is placed at a position higher than the first lighting device and irradiates the mobile object with light, the imaging control program causing the computer to execute: a control process of causing the first lighting device and the second lighting device to emit light in respective patterns while the imaging device is imaging the mobile object over a plurality of frames; and a selection process of selecting images acquired by imaging a mobile object irradiated with light in a preset manner depending on the height of the mobile object from among images for a plurality of frames.

Moreover, an imaging control program according to the present invention is an imaging control program which is mounted in a computer connected with an imaging device that images a mobile object, with a first lighting device that irradiates the mobile object with light, and with a second lighting device that is placed at a position higher than the first lighting device and irradiates the mobile object with light, the imaging control program causing the computer to execute: a specification process of specifying the height of the mobile object on the basis of a signal from a sensor for detecting the mobile object before the imaging device starts imaging the mobile object; and a control process of controlling the first lighting device and the second lighting device to emit light in a preset manner depending on the specified height while the imaging device is imaging the mobile object over a plurality of frames.

Advantageous Effects of Invention

It is possible with the present invention to acquire images that favorably show the situation in the mobile object seen through a window regardless of the height of the passing mobile object.

BRIEF DESCRIPTION OF DRAWINGS

FIG. 3 It depicts an explanatory diagram illustrating the heights of an imaging device and a first lighting device.

FIG. 4 It depicts an explanatory diagram illustrating the height of a second lighting device.

DESCRIPTION OF EMBODIMENTS

The following description will explain exemplary embodiments of the present invention with reference to the drawings.

Each of the following exemplary embodiments will be described using a case where a mobile object is a vehicle having a window at a side surface in order to simplify explanation. However, the present invention is also applicable to imaging of a mobile object other than a vehicle, such as a ship having a window at a side surface.

Moreover, in each exemplary embodiment, the sensor, the imaging device, the first lighting device, the second lighting device, and the like provided in the imaging system of the present invention are installed in the equipment installable area (a side area of the road where various equipment can be installed). In each exemplary embodiment, an operation in a case of imaging a vehicle running on a lane closest to the equipment installable area will be described as the operation of the imaging system of the present invention. When imaging a vehicle running on the second or subsequent lane from the equipment installable area side, no reflected glare of light occurs. Therefore, the operation of the imaging system according to the present invention for imaging a vehicle running on the second or subsequent lane from the equipment installable area side is not especially limited as long as the operation is an operation that makes it possible to favorably image the inside of the vehicle seen through a window in various kinds of vehicles.

Exemplary Embodiment 1

Figure 1:
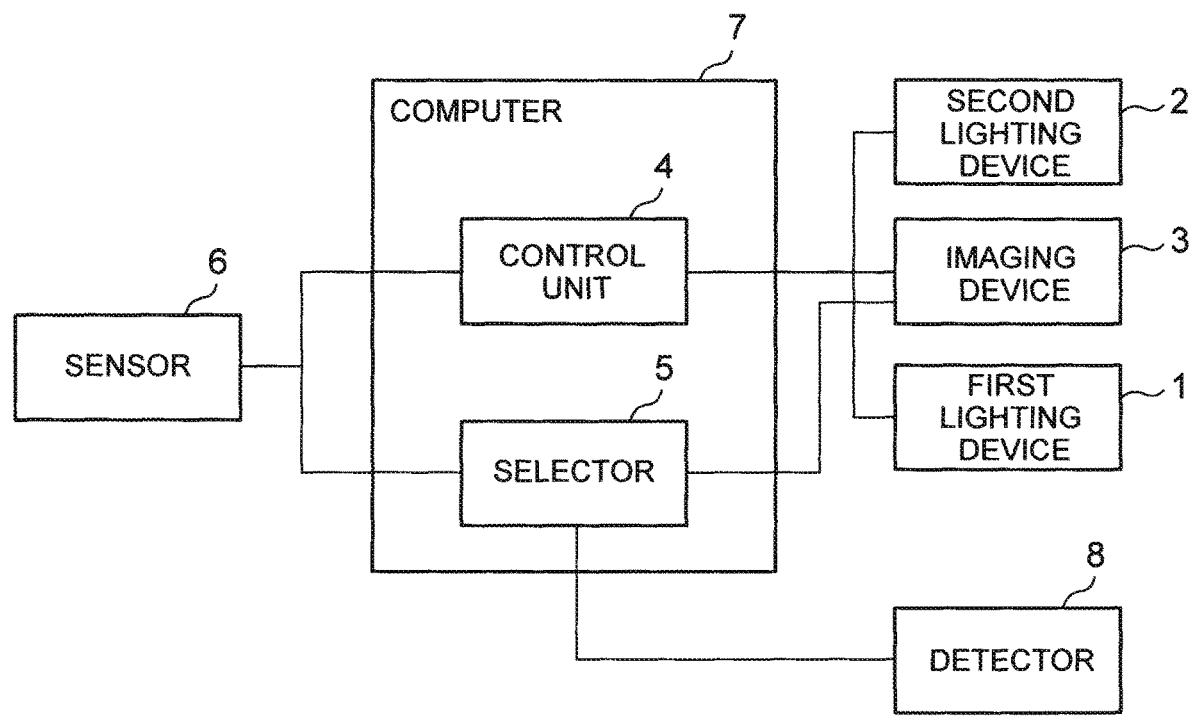
FIG. 1 It depicts a block diagram illustrating an example of an imaging system according to the first exemplary embodiment of the present invention.

FIG. 1 is a block diagram illustrating an example of an imaging system according to the first exemplary embodiment of the present invention. The imaging system of the first exemplary embodiment is provided with an imaging device 3, a first lighting device 1, a second lighting device 2, a control unit 4, a selector 5, and a sensor 6. Hereinafter, a case where the control unit 4 and the selector 5 are mounted in one computer 7 will be described as an example. However, the control unit 4 and the selector 5 may be mounted in another computer.

Moreover, the selector 5 is connected with the detector 8. The detector 8 may be provided inside the imaging system or may be provided outside the imaging system.

The elements illustrated in FIG. 1 may be connected by wire or may be connected by wireless.

Figure 2:
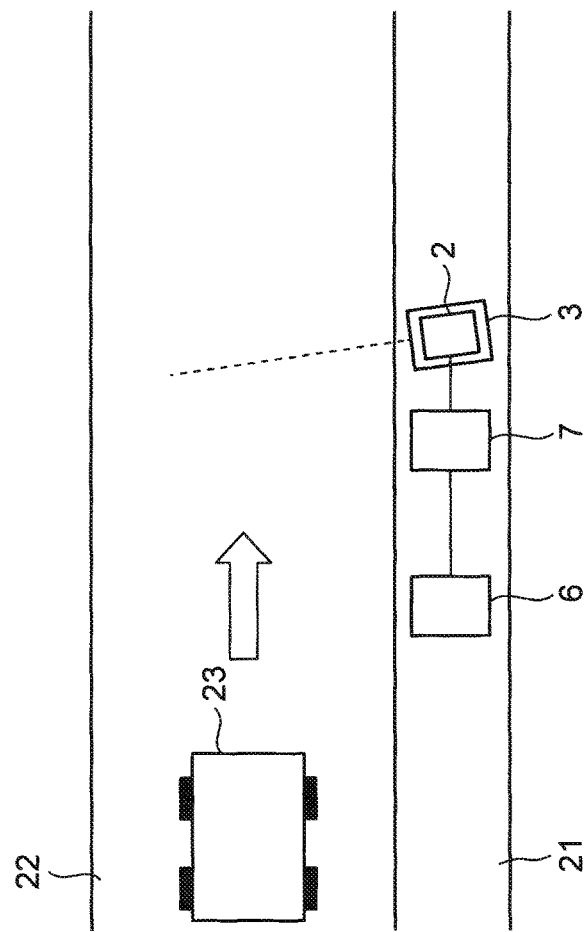
FIG. 2 It depicts an explanatory diagram illustrating an example of the arrangement place of an imaging system.

FIG. 2 is an explanatory diagram illustrating an example of the arrangement place of the imaging system. The sensor 6, the computer 7 (the control unit 4 and the selector 5), the imaging device 3, the first lighting device 1, and the second lighting device 2 provided in the imaging system are installed in an equipment installable area 21 provided in a side area of the road. The sensor 6 is installed upstream the imaging device 3, the first lighting device 1, and the second lighting device 2 along the flow of the vehicle. It is to be noted that the computer 7 may be wirelessly connected with other elements and installed at a place other than the equipment installable area 21. Moreover, the example in FIG. 2 illustrates a case where the first lighting device 1 is hidden below the imaging device 3. Moreover, illustration of the detector 8 is omitted in FIG. 2. The detector 8 may also be wirelessly connected with the computer 7 and installed at a place other than the equipment installable area 21.

The equipment installable area 21 illustrated in FIG. 2 is provided around a toll gate of a toll road, for example.

The imaging device 3, the first lighting device 1, and the second lighting device 2 are each installed to face slightly the upstream side of the flow of the vehicle as illustrated in FIG. 2.

The imaging device 3 is a camera that images the vehicle 23 passing on the lane 22.

The first lighting device 1 and the second lighting device 2 both emit light to a vehicle that is an object. The imaging device 3, the first lighting device 1, and the second lighting device 2 operate according to the control unit 4.

The first lighting device 1 is installed at a position slightly lower than the imaging device 3. Moreover, the second lighting device 2 is installed at a position slightly higher than the imaging device 3. Hereinafter, the heights of the imaging device 3, the first lighting device 1, and the second lighting device 2 will be described.

FIG. 3 is an explanatory diagram illustrating the heights of the imaging device 3 and the first lighting device 1. In FIG. 3, and FIG. 4 that will be described later, only a part of the vehicle is schematically illustrated as a vehicle. A vehicle 33 illustrated in FIG. 3 is a vehicle assumed to have a small vehicle height. As illustrated in FIG. 3, the imaging device 3 is installed at a height of the vicinity of the center of a window 34 at a side surface of the vehicle 33 assumed to have a small vehicle height. Moreover, the first lighting device 1 is installed at a height of the vicinity of the bottom of the window 34 at a side surface of the vehicle 33 assumed to have a small vehicle height.

Here, the vehicle 33 assumed to have a small vehicle height is a general passenger car. Even if there is a slight difference in the height of a window depending on the vehicle type of such a passenger car, the height of the vicinity of the center or the height of the vicinity of the bottom of a window at a side surface of such a general passenger car can be assumed. The height of the vicinity of the center of the window 34 at a side surface of the vehicle 33 assumed to have a small height may not coincide with the height of the center of a window at a side surface of a passenger car of an individual vehicle type. It is only required that the imaging device 3 is installed at an appropriate height as the height of the vicinity of the center of the window 34 at a side surface of the vehicle 33 assumed to have a small vehicle height. Similarly, the height of the vicinity of the bottom of the window 34 at a side surface of the vehicle 33 assumed to have a small height may not coincide with the height of the bottom of the window at a side surface of a passenger car of an individual vehicle type. The first lighting device 1 may be installed at an appropriate height as the height of the vicinity of the bottom of the window 34 at a side surface of the vehicle 33 assumed to have a small vehicle height.

The height of the vicinity of the center of the window 34 at a side surface of the vehicle 33 assumed to have a small vehicle height is, for example, 130 cm or around 130 cm. Accordingly, the imaging device 3 may be installed at a height of 130 cm or around 130 cm. Moreover, the height of the vicinity of the bottom of the window 34 at a side surface of the vehicle 33 assumed to have a small vehicle height is, for example, 115 cm or around 115 cm. Accordingly, the first lighting device 1 may be installed at a height of 115 cm or around 115 cm.

FIG. 4 is an explanatory diagram illustrating the height of the second lighting device 2. FIG. 4 also illustrates the imaging device 3 in order to illustrate the positional relationship between the second lighting device 2 and the imaging device 3. A vehicle 43 illustrated in FIG. 4 is a vehicle assumed to have a large vehicle height. As illustrated in FIG. 4, the second lighting device 2 is installed at a height of the vicinity of the bottom of a window 44 at a side surface of the vehicle 43 assumed to have a large vehicle height.

Here, the vehicle 43 assumed to have a large vehicle height is a large vehicle such as a large van. Even if there is a slight difference in the height of the window depending on the vehicle type of such a large car, the height of the vicinity of the bottom of a window at a side surface of such a large car can be assumed. The height of the vicinity of the bottom of the window 44 at a side surface of the vehicle 43 assumed to have a large vehicle height may not coincide with the height of the bottom of the window at a side surface of a large car of an individual vehicle type. It is only required that the second lighting device 2 is installed at an appropriate height as the height of the vicinity of the bottom of the window 44 of the vehicle 43 assumed to have a large vehicle height.

The height of the vicinity of the bottom of the window 44 at a side surface of the vehicle 43 assumed to have a large vehicle height is, for example, 140 cm or around 140 cm. Accordingly, the second lighting device 2 may be installed at a height of 140 cm or around 140 cm.

Hereinafter, a vehicle assumed to have a small height will be referred to simply as a vehicle having a small height, and a vehicle assumed to have a large height will be referred to simply as a vehicle having a large height.

In a case where the imaging device 3 and the first lighting device 1 are respectively installed at the heights described above and the imaging device 3 images the vehicle in a state in which the first lighting device 1 emits light when a vehicle having a small height passes, light from the first lighting device 1 is reflected at a window of the vehicle having a small height and then deviates from the angle of view of the imaging device 3. Accordingly, in this case, an image that favorably shows the state in the vehicle seen through a window without reflected glare of light can be acquired.

Furthermore, in a case where the second lighting device 2 is installed at the height described above and the imaging device 3 images the vehicle in a state in which the second lighting device 2 emits light when a vehicle having a large vehicle height passes, light from the second lighting device 2 is reflected at a window of the vehicle having a large vehicle height and then deviates from the angle of view of the imaging device 3. Accordingly, in this case, an image that favorably shows the state in the vehicle seen through a window without reflected glare of light can be acquired.

It is to be noted that reflected glare of light may occur when the imaging device 3 images a vehicle having a small vehicle height in a state in which the second lighting device 2 emits light while the vehicle is passing. This is because light from the second lighting device 2 may be reflected at a window of the vehicle having a small vehicle height and then included in the angle of view of the imaging device 3. However, in a case where a vehicle having a small vehicle height runs at a position on the lane 22 away from the imaging device 3, reflected glare of light due to the second lighting device 2 does not occur since light from the second lighting device 2 is reflected at a window of the vehicle and then deviates from the angle of view of the imaging device 3. Moreover, in a case where the imaging device 3 images a vehicle having a large vehicle height in a state in which the first lighting device 1 emits light while the vehicle is passing, light from the first lighting device 1 does not reach a window of the vehicle having a large vehicle height, and therefore reflected glare of light due to such light does not occur.

The sensor 6 detects a vehicle 23 passing on the lane 22. The sensor 6 emits a laser beam, receives reflected light at the reflection point of the laser beam, and detects the distance from the sensor 6 to the reflection point on the basis of a time from emission of a laser beam to reception of reflected light. In the sensor 6, a part (unillustrated) that emits a laser beam rotates in the vertical direction. Moreover, the rotational surface of the part that emits a laser beam is parallel to a plane in the road crossing direction. By this rotation, the sensor 6 performs scanning with a laser beam in the vertical direction. That is, the sensor 6 performs scanning with a laser beam in the vertical direction, and detects the distance to the reflection point of the laser beam. Accordingly, when the vehicle 23 passes on the lane 22 as illustrated in FIG. 2, the sensor 6 detects the distance from the sensor 6 to the vehicle 23. The sensor 6 may determine that the vehicle 23 has passed on the lane 22 in a case where the detection distance acquired when emitting a laser beam in the horizontal direction is equal to or less than a predetermined value, for example. Moreover, the detection distance may be determined as the distance from the sensor 6 to the vehicle 23.

Furthermore, the sensor 6 detects an elevation angle from the sensor 6 to the roof of the vehicle 23. The sensor 6 can determine the elevation angle from the sensor 6 to the roof of the vehicle 23 on the basis of the irradiation direction of the laser beam when the detection distance changes drastically when the vehicle 23 passing on the lane 22 is detected.

In the following description, a case where the sensor 6 determines the elevation angle from the sensor 6 to the roof of the vehicle 23 will be described as an example. However, a part of the vehicle 23 for which the elevation angle is to be determined is not limited to the roof. For example, the sensor 6 may determine the elevation angle from the sensor 6 to a window of the vehicle 23. In this case, the sensor 6 may determine the elevation angle from the sensor 6 to the upper side of the window of the vehicle 23, the elevation angle from the sensor 6 to the center of the window of the vehicle 23, or the elevation angle from the sensor 6 to the lower side of the window of the vehicle 23.

When the sensor 6 detects the vehicle 23 passing on the lane 22, the sensor 6 notifies the control unit 4 and the selector 5 that the vehicle 23 has been detected. The sensor 6 further notifies the selector 5 of the elevation angle from the sensor 6 to the roof of the vehicle 23, and the distance from the sensor 6 to the vehicle 23.

It is to be noted that the sensor 6 may be a camera having a function of detecting the vehicle 23 by image recognition, a function of detecting the distance from the sensor 6 to the vehicle 23 by image recognition, and a function of detecting the elevation angle from the sensor 6 to the roof of the vehicle 23 by image recognition. In a case where the sensor 6 is such a camera, the sensor 6 may be provided as a camera different from the imaging device 3. Alternatively, the imaging device 3 may operate as the sensor 6 described above.

When the control unit 4 receives a notification (which will be hereinafter referred to as a vehicle detection notification) indicating that the vehicle 23 passing on the lane 22 has been detected from the sensor 6, the control unit 4 causes the imaging device 3 to image the vehicle 23 over a plurality of frames (e.g., 15 frames). Although 15 frames are illustrated here, how many frames are to be captured by the imaging device 3 may be preset. Moreover, the control unit 4 causes the first lighting device 1 and the second lighting device 2 to emit light in respective patterns in the plurality of frames.

Figure 5:
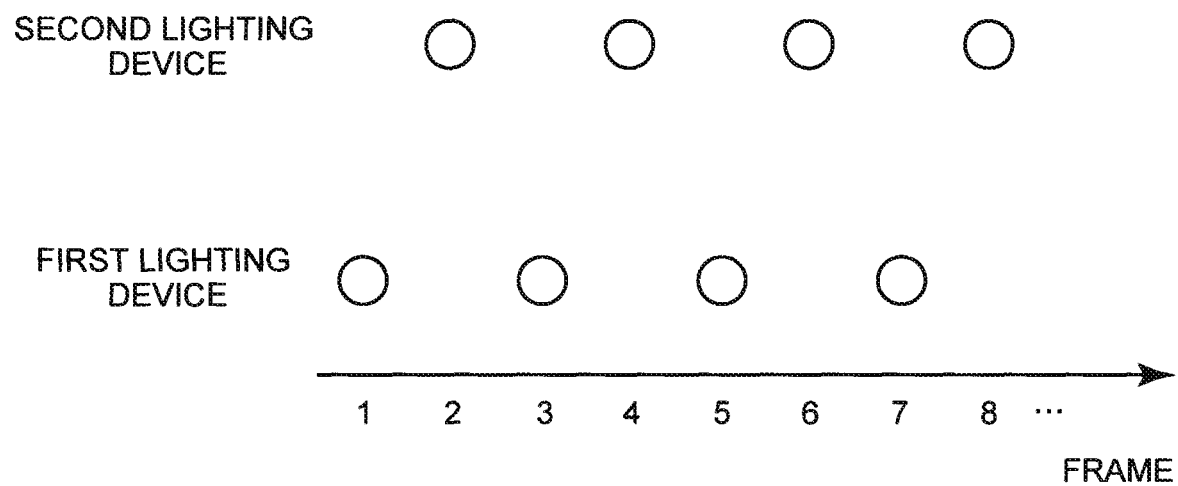
FIG. 5 It depicts a schematic diagram illustrating an example of patterns in which the control unit causes the first lighting device and the second lighting device to emit light in the first exemplary embodiment.

FIG. 5 is a schematic diagram illustrating an example of patterns in which the control unit 4 causes the first lighting device 1 and the second lighting device 2 to emit light. The horizontal axis in FIG. 5 represents the order of the frames. Moreover, each circular marker in FIG. 5 represents that a lighting device emits light. That is, FIG. 5 represents that the control unit 4 causes the first lighting device 1 and the second lighting device 2 to emit light alternately every frame. Although FIG. 5 illustrates a case where the control unit 4 causes the first lighting device 1 to emit light in odd-numbered frames and the second lighting device 2 to emit light in even-numbered frames, the control unit 4 may cause the first lighting device 1 to emit light in even-numbered frames and the second lighting device 2 to emit light in odd-numbered frames. Moreover, the control unit 4 may cause the first lighting device 1 and the second lighting device 2 to emit light alternately per a plurality of frames. For example, the control unit 4 may cause the first lighting device 1 and the second lighting device 2 to emit light alternately every two frames.

Figure 6:
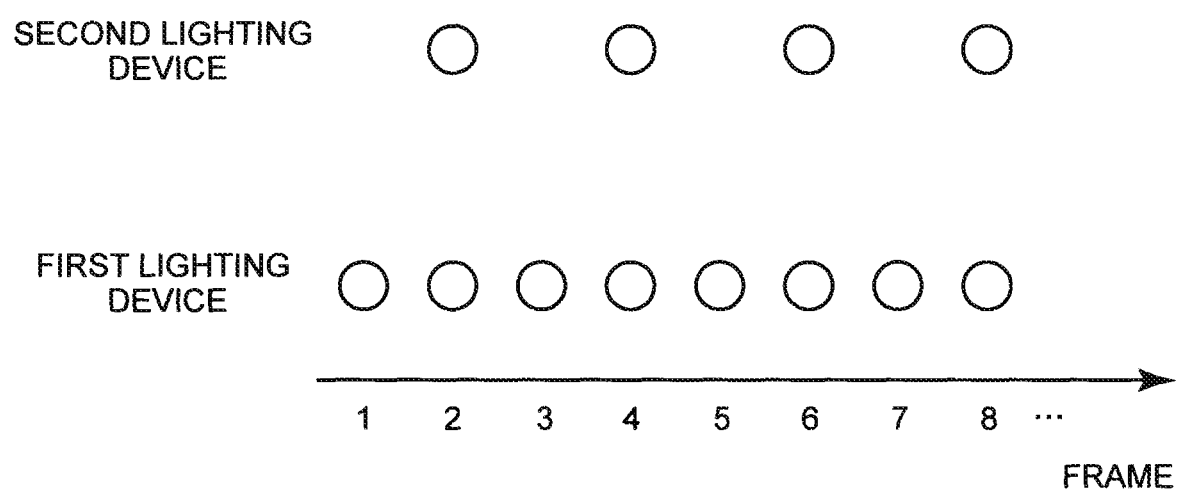
FIG. 6 It depicts a schematic diagram illustrating an example of other patterns in which the control unit causes the first lighting device and the second lighting device to emit light in the first exemplary embodiment.

FIG. 6 is a schematic diagram illustrating an example of patterns in which the control unit 4 causes the first lighting device 1 and the second lighting device 2 to emit light. The horizontal axis and the markers in FIG. 6 are similar to the horizontal axis and the markers in FIG. 5. That is, FIG. 6 represents that the control unit 4 causes the first lighting device 1 to emit light in each frame and causes the second lighting device 2 to emit light every other frame. In other words, the control unit 4 switches between a state, in which only the first lighting device 1 emits light, and a state, in which both of the first lighting device 1 and the second lighting device 2 emit light, every frame. Although FIG. 6 illustrates a case where the control unit 4 causes the second lighting device 2 to emit light in even-numbered frames, the control unit 4 may cause the second lighting device 2 to emit light in odd-numbered frames.

As illustrated in FIGS. 5 and 6, the patterns in which the control unit 4 causes the first lighting device 1 and the second lighting device 2 to emit light are not limited to one type. However, in the first exemplary embodiment, the patterns in which the control unit 4 causes the first lighting device 1 and the second lighting device 2 to emit light are preset.

The selector 5 receives a vehicle detection notification, information on the elevation angle from the sensor 6 to the roof of the vehicle 23 (which will be hereinafter referred to simply as an elevation angle), and information on the distance from the sensor 6 to the vehicle 23 (which will be hereinafter referred to simply as the distance to the vehicle 23) from the sensor 6. The selector 5 preliminarily stores the height of the sensor 6, and calculates the vehicle height of the vehicle 23 on the basis of the height of the sensor 6, the elevation angle, and the distance to the vehicle 23.

The selector 5 selects images from among images for a plurality of frames generated from imaging by the imaging device 3 depending on at least the vehicle height of the vehicle 23. A specific example of the operation of the selector 5 will be described later. Moreover, the selector 5 transmits the selected images to the detector 8.

The detector 8 detects the state in the vehicle on the basis of the images transmitted from the selector 5. For example, the detector 8 may detect a person in the image. Moreover, for example, the detector 8 may detect the position of a person in the image. Moreover, for example, the detector 8 may detect the number of people shown in the image. Moreover, for example, the detector 8 may detect the state of a person shown in the image (such as whether a seat belt is worn or not). These are examples of the detection target of the detector 8, and a detection target of the detector 8 is not limited to the above examples. The method of detecting a detection target by the detector 8 on the basis of an image may be a known method.

The control unit 4 and the selector 5 are implemented by, for example, a Central Processing Unit (CPU) of the computer 7 operating according to the imaging control program. In this case, the CPU may read an imaging control program from a program recording medium such as a program storage device (unillustrated in FIG. 1) of the computer 7 and operate as the control unit 4 and the selector 5 according to the imaging control program, for example.

Moreover, the control unit 4 and the selector 5 may be implemented by separate processors in the computer 7.

Moreover, the detector 8 may be mounted in the computer 7. In this case, the above-described CPU may operate as the control unit 4 and the selector 5, and further as the detector 8 according to the imaging control program. In the computer 7, the detector 8 may be implemented by a processor different from the CPU that operates as the control unit 4 and the selector 5. Moreover, the control unit 4, the selector 5, and the detector 8 may be implemented by separate processors.

Figure 7:
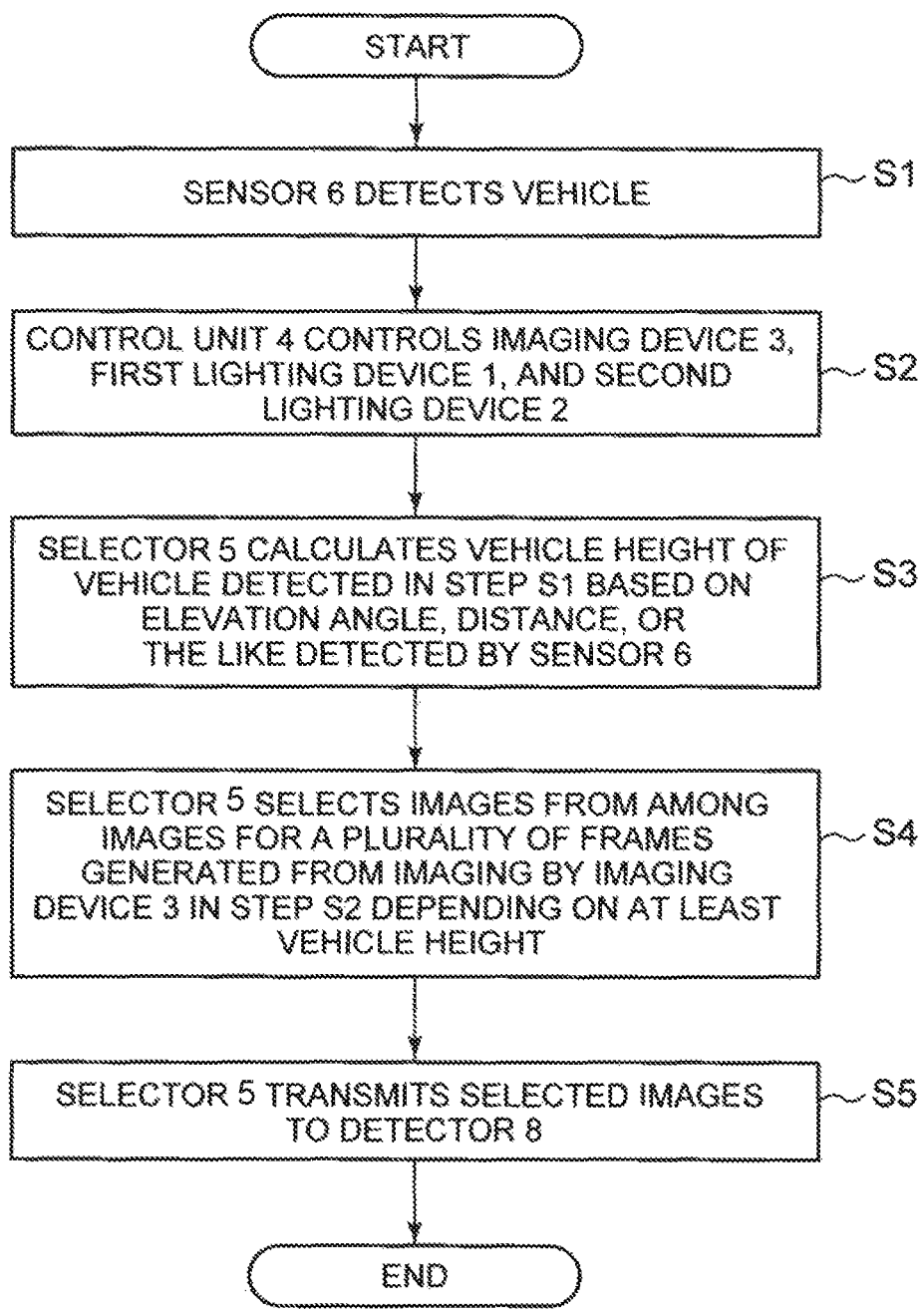
FIG. 7 It depicts a flowchart illustrating an example of the process progress of the first exemplary embodiment.

Next, the process progress of the first exemplary embodiment will be described. FIG. 7 is a flowchart illustrating an example of the process progress of the first exemplary embodiment. The description of the operation already described will be appropriately omitted.

First, when the vehicle 23 passes on the lane 22 (see FIG. 2), the sensor 6 detects the vehicle 23 (step S1). In step S1, the sensor 6 also detects the distance to the vehicle 23 and the elevation angle (the elevation angle from the sensor 6 to the roof of the vehicle 23). Furthermore, the sensor 6 gives a vehicle detection notification to the control unit 4 and the selector 5. At this time, the sensor 6 further notifies the selector 5 of information on the elevation angle and the distance to the vehicle 23.

When receiving the vehicle detection notification, the control unit 4 causes the imaging device 3, the first lighting device 1, and the second lighting device 2 to start operation, and controls the imaging device 3, the first lighting device 1, and the second lighting device 2 (step S2).

For example, the control unit 4 causes the imaging device 3 to image the vehicle 23 over a plurality of frames, and causes the first lighting device 1 and the second lighting device 2 to emit light alternately every frame. Alternatively, for example, the control unit 4 may cause the imaging device 3 to image the vehicle 23 over a plurality of frames, cause the first lighting device 1 to emit light in each frame, and cause the second lighting device 2 to emit light every other frame.

The imaging device 3 transmits images for a plurality of frames generated by imaging to the selector 5.

Moreover, when receiving a vehicle detection notification and information on the elevation angle and the distance to the vehicle 23 from the sensor 6, the selector 5 calculates the vehicle height of the vehicle 23 detected in step S1 on the basis of information on the elevation angle and the distance to the vehicle 23 or the like (step S3).

Next, after receiving a vehicle detection notification from the sensor 6, the selector 5 selects images from among the plurality of images transmitted from the imaging device 3. At this time, the selector 5 selects images from among images for a plurality of frames generated from imaging by the imaging device 3 in step S2 depending on at least the vehicle height of the vehicle 23 (step S4).

The operation of the selector 5 to select images will be described more specifically. Here, first, a case where the control unit 4 causes the first lighting device 1 and the second lighting device 2 to emit light alternately every frame will be described as an example. In this case, the selector 5 selects images as follows.

In a case where the calculated vehicle height of the vehicle 23 is smaller than a preset threshold, it can be said that the vehicle 23 is a vehicle having a small height. In a case where the calculated vehicle height of the vehicle 23 is smaller than a preset threshold, the selector 5 selects images generated when the imaging device 3 performs imaging when the first lighting device 1 emits light. That is, the selector 5 selects images that show the vehicle 23 irradiated with light from the first irradiation device 1. In the example illustrated in FIG. 5, the selector 5 selects images of odd-numbered frames. In this case, the vehicle 23 is a vehicle having a small vehicle height. When the first lighting device 1 emits light, the second lighting device 2 does not emit light. Accordingly, the selector 5 selects images generated when the imaging device 3 performs imaging when the first lighting device 1 emits light, so that images that favorably show the state in the vehicle seen through a window without reflected glare of light can be selected.

In a case where the calculated vehicle height of the vehicle 23 is equal to or larger than a preset threshold, it can be said that the vehicle 23 is a vehicle having a large vehicle height. In a case where the calculated vehicle height of the vehicle 23 is equal to or larger than a preset threshold, the selector 5 selects images generated when the imaging device 3 performs imaging when the second lighting device 2 emits light. That is, the selector 5 selects images that show the vehicle 23 irradiated with light from the second irradiation device 2. In the example illustrated in FIG. 5, the selector 5 selects images of even-numbered frames. In this case, the vehicle 23 is a vehicle having a large vehicle height. Accordingly, the selector 5 selects images generated when the imaging device 3 performs imaging when the second lighting device 2 emits light, so that images that favorably show the state in the vehicle seen through a window without reflected glare of light can be selected.

In other words, the selector 5 selects images that show a mobile object irradiated with light in a preset manner depending on the vehicle height of the vehicle 23 from among images for a plurality of frames acquired from imaging by the imaging device 3. That is, for example, the selector 5 selects images generated when imaging is performed in a manner that the vehicle 23 is irradiated with light from the first lighting device 1 and not irradiated with light from the second lighting device 2 in a case where the vehicle height of the vehicle 23 is smaller than a preset threshold. Moreover, the selector 5 selects images generated when imaging is performed in a manner that the vehicle 23 is irradiated with light from the second lighting device 2 and is not irradiated with light from the first lighting device 1 in a case where the vehicle height of the vehicle 23 is equal to or larger than a preset threshold.

Accordingly, images that favorably show the state in the vehicle seen through a window without reflected glare of light can be selected regardless of the vehicle height.

Another example of the operation of the selector 5 for selecting images will be described. Here, a case where the control unit 4 causes the first lighting device 1 to emit light in each frame and causes the second lighting device 2 to emit light every other frame will be described as an example. In this case, the selector 5 selects images on the basis of the vehicle height of the vehicle 23 and the distance to the vehicle 23.

Figure 8:
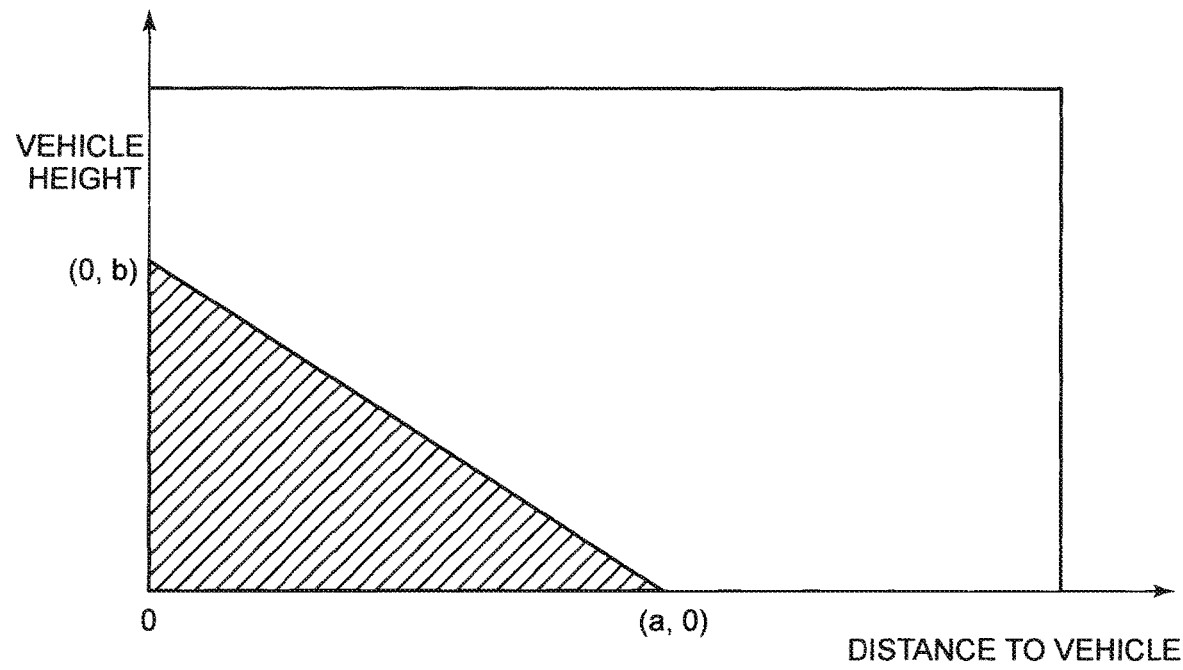
FIG. 8 It depicts a schematic diagram illustrating the relationship between the vehicle height and the distance to the vehicle, and the occurrence of reflected glare of light due to the second lighting device.

FIG. 8 is a schematic diagram illustrating the relationship between the vehicle height and the distance to the vehicle, and the occurrence of reflected glare of light due to the second lighting device 2. The horizontal axis of the graph illustrated in FIG. 8 represents the distance to the vehicle. However, assume that the vehicle passes on a lane 22 (see FIG. 2) closest to the equipment installable area 21. That is, the distance indicated by the horizontal axis of the graph is the distance from the sensor 6 to the vehicle 23 running on the lane 22. The vertical axis of the graph illustrated in FIG. 8 represents the vehicle height.

By installing the imaging device 3, the first lighting device 1, and the second lighting device 2 respectively at the above-described heights, reflected glare of light due to light emitted by the first lighting device 1 does not occur. However, as described above, reflected glare of light may occur in a case where the imaging device 3 images a vehicle having a small vehicle height while the second lighting device 2 is emitting light. Nevertheless, such reflected glare of light does not occur when the vehicle 23 is running at a position on the lane 22 away from the imaging device 3.

The graph illustrated in FIG. 8 illustrates an area represented by coordinates of (Distance to Vehicle, Vehicle Height). In addition, in a case where the position indicated by the coordinates (Distance to Vehicle, Vehicle Height) is within the triangular area indicated with hatched lines in the graph illustrated in FIG. 8, reflected glare of light due to the second lighting device 2 occurs. The area of this triangle is an area of a triangle having vertices at coordinates (0, 0), (a, 0), and (0, b). This means that the limit value of the distance (distance to the vehicle) with which reflected glare of light due to the second lighting device 2 occurs during imaging of a vehicle having a small vehicle height becomes shorter as the vehicle height becomes larger in a case where the vehicle height is equal to or smaller than b. It is to be noted that a and b are preset constants.

It is to be understood from the graph illustrated in FIG. 8 that reflected glare of light due to the second lighting device 2 does not occur in a case where the distance to the vehicle is larger than a, or the vehicle height is larger than b. In a case where the distance to the vehicle is equal to or smaller than a, or the vehicle height is equal to or smaller than b, reflected glare of light due to the second lighting device 2 occurs when coordinates represented by (Distance to Vehicle, Vehicle Height) are within the above triangular area, and reflected glare of light due to the second lighting device 2 does not occur when coordinates represented by (Distance to Vehicle, Vehicle Height) are out of the above triangular area.

From the above, the selector 5 selects images as follows. In a case where coordinates represented by (Distance to Vehicle, Vehicle Height) are within an area of a triangle having vertices at coordinates (0, 0), (a, 0), and (0, b), the selector 5 selects images generated from imaging by the imaging device 3 when only the first lighting device 1 emits light. In the example illustrated in FIG. 6, the selector 5 selects images of odd-numbered frames. In this case, since the vehicle height is equal to or smaller than b, it can be said that the passing vehicle is a vehicle having a small vehicle height. At this time, since the selector 5 selects images generated from imaging by the imaging device 3 when only the first lighting device 1 emits light, reflected glare of light due to the second lighting device 2 does not occur in the selected images. Moreover, since the first lighting device 1 emits light, the selected images are images that favorably show the state in the vehicle seen through a window. Accordingly, it is possible to select images that favorably show the state in the vehicle seen through a window without reflected glare of light.

In a case where coordinates represented by (Distance to Vehicle, Vehicle Height) are out of an area of a triangle having vertices at coordinates (0, 0), (a, 0), and (0, b), the selector 5 selects images generated from imaging by the imaging device 3 when both of the first lighting device 1 and the second lighting device 2 emit light. In the example illustrated in FIG. 6, the selector 5 selects images of even-numbered frames. Assume that the passing vehicle is a vehicle having a large vehicle height. In this case, even when the first lighting device 1 emits light, reflected glare of light does not occur in images of the vehicle having a large vehicle height. Moreover, since the second lighting device 2 emits light, the selected images are images that favorably show the state in the vehicle seen through a window. Moreover, assume that the passing vehicle is a vehicle having a small vehicle height. In this case, since coordinates represented by (Distance to Vehicle, Vehicle Height) are out of the above triangular area, the distance to the vehicle is long, and reflected glare of light does not occur even when the second lighting device 2 emits light. Moreover, since the first lighting device 1 emits light, the selected images are images that favorably show the state in the vehicle seen through a window. Accordingly, images that favorably show the state in the vehicle seen through a window without reflected glare of light can be selected regardless of the vehicle height.

In other words, the selector 5 selects images that show a mobile object irradiated with light in a preset manner depending on the combination of the vehicle height of the vehicle 23 and the distance to the vehicle 23 from among images for a plurality of frames acquired from imaging by the imaging device 3. The selector 5 selects images generated when imaging is performed in a manner that the first irradiation device 1 irradiates the vehicle 23 with light and the second lighting device 2 does not irradiate the vehicle 23 with light in a case where coordinates represented by (Distance to Vehicle, Vehicle Height) are within an area of a triangle having vertices at coordinates (0, 0), (a, 0), and (0, b). Moreover, the selector 5 selects images generated when imaging is performed in a manner that both of the first lighting device 1 and the second lighting device 2 irradiate the vehicle 23 with light in a case where coordinates represented by (Distance to Vehicle, Vehicle Height) are out of an area of a triangle having vertices at coordinates (0, 0), (a, 0), and (0, b).

In the example described here, it can be said that the selector 5 selects images generated from imaging by the imaging device 3 when only the first lighting device 1 emits light in a case where the combination of the distance to the vehicle and the vehicle height satisfies a predetermined condition (condition that coordinates represented by (Distance to Vehicle, Vehicle Height) are within the above-mentioned triangular area), or selects images generated from imaging by the imaging device 3 when both of the first lighting device 1 and the second lighting device 2 emit light in a case where the combination does not satisfy the predetermined condition.

In a case where coordinates represented by (Distance to Vehicle, Vehicle Height) as described above are used, the control unit 4 may cause the first lighting device 1 and the second lighting device 2 to emit light alternately every frame as in the case illustrated in FIG. 5.

The selector 5 transmits the images selected in step S4 to the detector 8 (step S5).

It is to be noted that the detector 8 detects the state in the vehicle on the basis of the images transmitted from the selector 5. For example, the detector 8 detects the position of a person in the image. However, the detection target of the detector 8 may not be the position of a person as described above.

It is possible with the present exemplary embodiment to select images that favorably show the state in the vehicle seen through a window without reflected glare of light regardless of the vehicle height of the vehicle by the above operation.

For example, assume that the control unit 4 causes the imaging device 3 to image the vehicle 23 over a plurality of frames and causes the first lighting device 1 and the second lighting device 2 to emit light alternately every frame. At this time, in a case where the calculated vehicle height of the vehicle 23 is smaller than a preset threshold, the selector 5 selects images generated from imaging by the imaging device 3 when the first lighting device 1 emits light. In a case where the calculated vehicle height of the vehicle 23 is equal to or larger than a predetermined threshold, the selector 5 selects images generated from imaging by the imaging device 3 when the second lighting device 2 emits light. Accordingly, images that favorably show the state in the vehicle seen through a window without reflected glare of light can be selected regardless of the vehicle height.

Moreover, for example, assume that the control unit 4 causes the imaging device 3 to image the vehicle 23 over a plurality of frames, causes the first lighting device 1 to emit light in each frame, and causes the second lighting device 2 to emit light every other frame. At this time, the selector 5 selects images generated from imaging by the imaging device 3 when only the first lighting device 1 emits light in a case where coordinates represented by (Distance to Vehicle, Vehicle Height) are within an area of a triangle having vertices at coordinates (0, 0), (a, 0), and (0, b). The selector 5 selects images generated from imaging by the imaging device 3 when both of the first lighting device 1 and the second lighting device 2 emit light in a case where coordinates represented by (Distance to Vehicle, Vehicle Height) are out of the above triangular area. Accordingly, images that favorably show the state in the vehicle seen through a window without reflected glare of light can be selected regardless of the vehicle height. It is to be noted that imaging can be performed in a state in which both of the first lighting device 1 and the second lighting device 2 emit light so as to make the inside of a vehicle having a small vehicle height into a well-lighted state as long as reflected glare of light due to the second lighting device 2 does not occur.

Exemplary Embodiment 2

In the first exemplary embodiment, patterns in which the control unit 4 causes the first lighting device 1 and the second lighting device 2 to emit light are preset. On the other hand, an imaging system of the second exemplary embodiment determines patterns, in which two lighting devices are caused to emit light, depending on the detection result of a sensor. That is, in the second exemplary embodiment, the patterns in which the two lighting devices emit light change depending on the detection result of the sensor.

Figure 9:
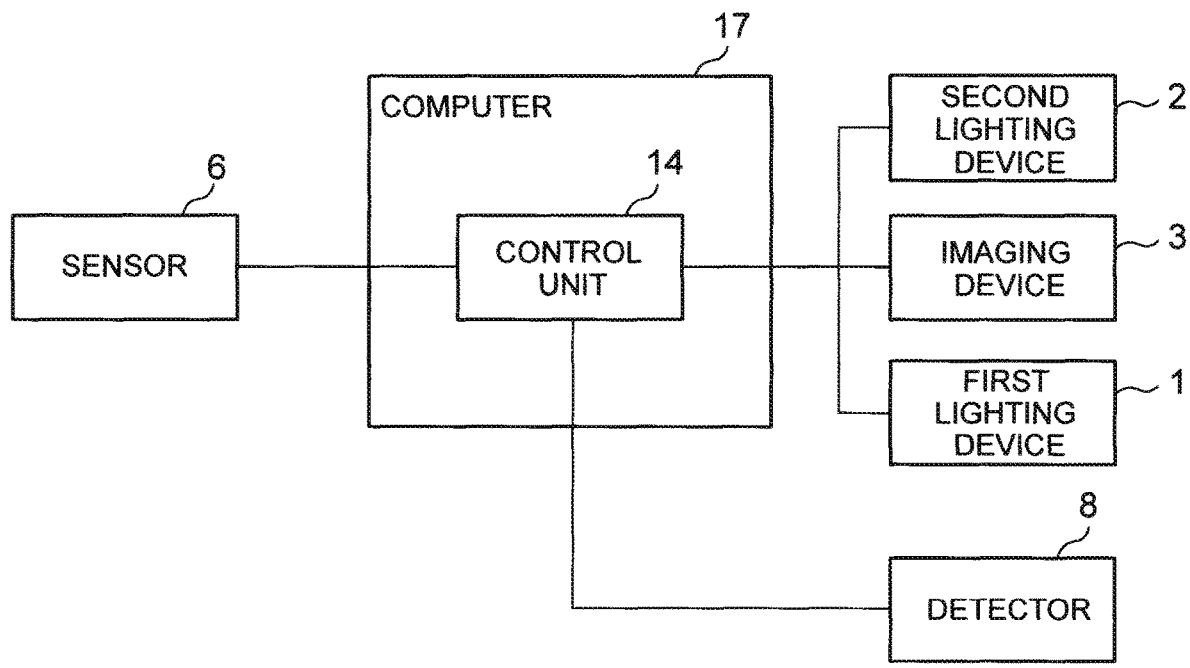
FIG. 9 It depicts a block diagram illustrating an example of an imaging system according to the second exemplary embodiment of the present invention.

FIG. 9 is a block diagram illustrating an example of an imaging system according to the second exemplary embodiment of the present invention. The same elements as the elements described in the first exemplary embodiment are denoted at the same reference symbols as in FIG. 1, and the detailed description will be omitted. The imaging system of the second exemplary embodiment is provided with an imaging device 3, a first lighting device 1, a second lighting device 2, a control unit 14, and a sensor 6. Hereinafter, a case where the control unit 4 is mounted in one computer 17 will be described as an example.

The control unit 14 is also connected with the detector 8. The detector 8 may be provided in the imaging system. The detector 8 is the same as the detector 8 in the first exemplary embodiment, and the description will be omitted.

The elements illustrated in FIG. 9 may be connected by wire or may be connected by wireless.

Moreover, the arrangement manner of the imaging system according to the second exemplary embodiment is the same as the arrangement manner (see FIG. 2) of the imaging system according to the first exemplary embodiment, and the description will be omitted.

The imaging device 3 is a camera that images the vehicle 23 passing on the lane 22. The first lighting device 1 and the second lighting device 2 both emit light to a vehicle that is an object. The imaging device 3, the first lighting device 1, and the second lighting device 2 operate according to the control unit 14.

The height of the installation position of the imaging device 3, the height of the installation position of the first lighting device 1, and the height of the installation position of the second lighting device 2 are respectively similar to the heights thereof in the first exemplary embodiment, and the description will be omitted.

The sensor 6 is similar to the sensor 6 in the first exemplary embodiment. However, in the second exemplary embodiment, the sensor 6 notifies the control unit 14 of a vehicle detection notification, the distance to the vehicle 23 (the distance from the sensor 6 to the vehicle 23), and the elevation angle (the elevation angle from the sensor 6 to the roof of the vehicle 23).

When receiving the vehicle detection notification and information on the distance to the vehicle 23 and the elevation angle from the sensor 6, the control unit 14 calculates the vehicle height of the detected vehicle 23 on the basis of the height of the sensor 6, the distance to the vehicle 23, and the elevation angle. The control unit 14 may preliminarily store the height of the sensor 6.

Moreover, the control unit 14 causes the imaging device 3 to image the vehicle 23 over a plurality of frames (e.g., 15 frames). Although 15 frames are illustrated here, how many frames are to be captured by the imaging device 3 may be preset.

When causing the imaging device 3 to capture a plurality of frames, the control unit 14 controls the first lighting device 1 and the second lighting device 2 depending on at least the vehicle height of the vehicle 23. The specific example of the operation of the control unit 14 to control the first lighting device 1 and the second lighting device 2 will be described later.

The control unit 14 is implemented by, for example, a CPU of the computer 17 that operates according to the imaging control program. In this case, the CPU may read an imaging control program from a program recording medium such as a program storage device (unillustrated in FIG. 9) of the computer 17 and operate as the control unit 14 according to the imaging control program, for example.

Moreover, the detector 8 may be mounted in the computer 17. In this case, the above-described CPU may operate as the control unit 14 according to the imaging control program and may further operate as the detector 8. In the computer 17, the detector 8 may be implemented by a processor different from the CPU operating as the control unit 14.

Figure 10:
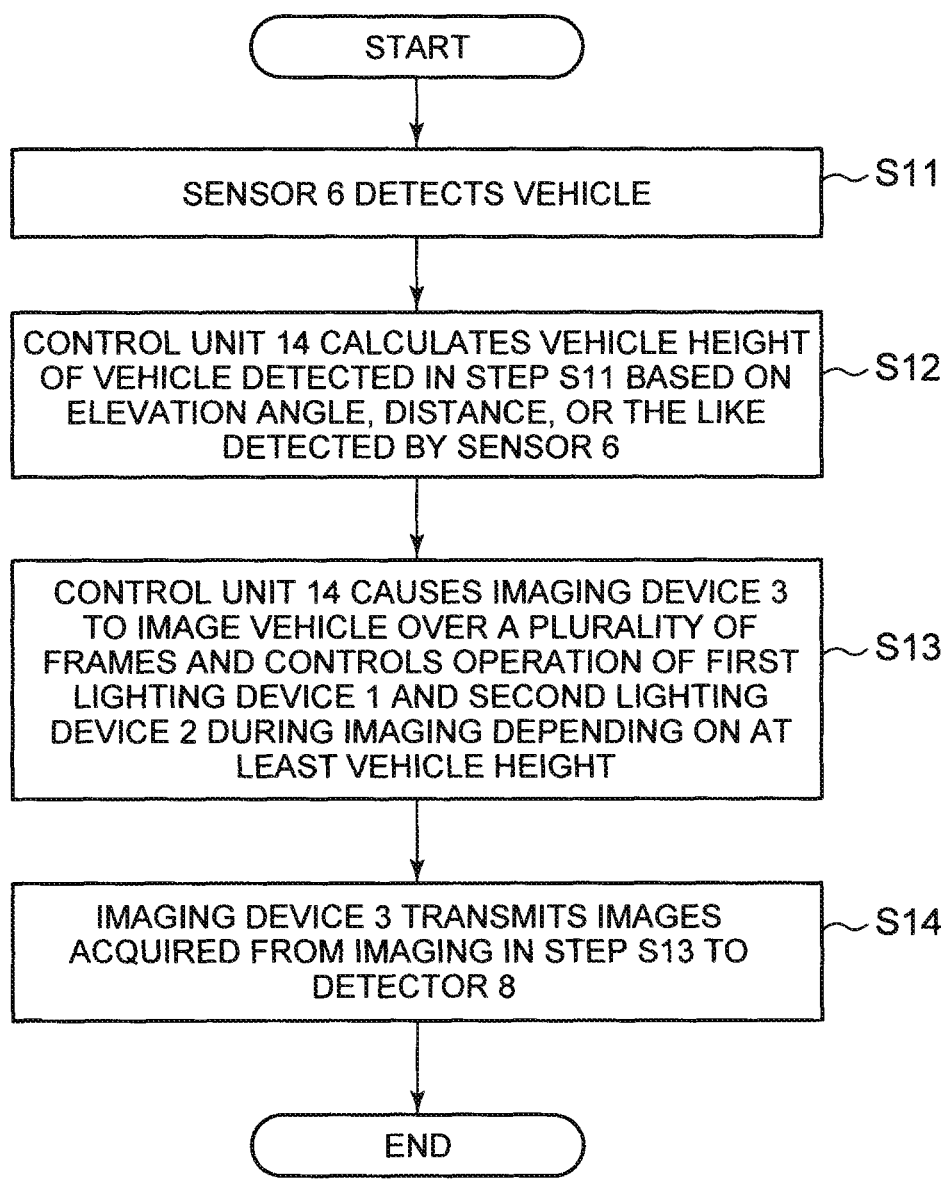
FIG. 10 It depicts a flowchart illustrating an example of the process progress of the second exemplary embodiment.

Next, the process progress of the second exemplary embodiment will be described. FIG. 10 is a flowchart illustrating an example of the process progress of the second exemplary embodiment.

First, when the vehicle 23 passes on the lane 22 (see FIG. 2), the sensor 6 detects the vehicle 23 (step S11). In step S11, the sensor 6 also detects the distance to the vehicle 23 and the elevation angle (the elevation angle from the sensor 6 to the roof of the vehicle 23). Furthermore, the sensor 6 notifies the control unit 14 of a vehicle detection notification, and information on the elevation angle and the distance to the vehicle 23.

When the control unit 14 receives the vehicle detection notification and information on the elevation angle and the distance to the vehicle 23 from the sensor 6, the control unit 14 calculates the vehicle height of the vehicle 23 detected in step S11 on the basis of the information on the elevation angle and the distance to the vehicle 23 or the like (step S12).

The control unit 14 then causes the imaging device 3 to image the vehicle 23 over a plurality of frames, and controls the operation of the first lighting device 1 and the second lighting device 2 depending on at least the calculated vehicle height during the imaging (step S13).

An example in which the control unit 14 controls the operation of the first lighting device 1 and the second lighting device 2 will be specifically described.

Figure 11:
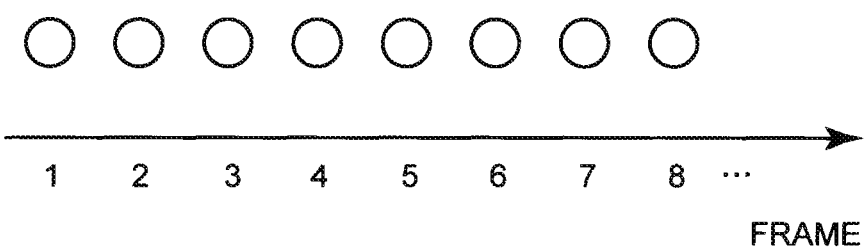
FIG. 11 It depicts a schematic diagram illustrating an example of light irradiation patterns of the first lighting device and the second lighting device in the second exemplary embodiment.

In a case where the vehicle height of the vehicle 23 calculated in step S12 is smaller than a preset threshold, the control unit 14 causes only the first lighting device 1 to emit light in each frame and does not cause the second lighting device 2 to emit light. FIG. 11 is a schematic diagram illustrating light emission patterns of the first lighting device 1 and the second lighting device 2 in this case. The horizontal axis and the markers illustrated in FIG. 11 are similar to the horizontal axis and the markers illustrated in FIG. 5. In a case where the vehicle height of the vehicle 23 calculated in step S12 is smaller than a preset threshold, it can be said that the vehicle 23 is a vehicle having a small vehicle height. Accordingly, since the control unit 14 causes only the first lighting device 1 to emit light in each frame and does not cause the second lighting device 2 to emit light, the imaging device 3 can generate images that favorably show the state in the vehicle seen through a window by imaging. Moreover, reflected glare of light due to the first lighting device 1 does not occur, and reflected glare of light due to the second lighting device 2 also does not occur since the second lighting device 2 is not caused to emit light. Accordingly, since the control unit 14 controls the first lighting device 1 and the second lighting device 2 as described above, images that favorably show the state in the vehicle seen through a window without reflected glare of light can be acquired as a result of imaging a vehicle having a small vehicle height by the imaging device 3.

Figure 12:
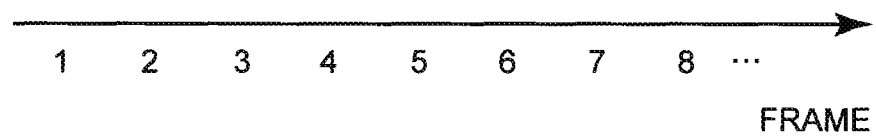
FIG. 12 It depicts a schematic diagram illustrating an example of light irradiation patterns of the first lighting device and the second lighting device in the second exemplary embodiment.

Moreover, in a case where the vehicle height of the vehicle 23 calculated in step S12 is equal to or larger than a preset threshold, the control unit 14 causes only the second lighting device 2 to emit light in each frame and does not cause the first lighting device 1 to emit light. FIG. 12 is a schematic diagram illustrating light emission patterns of the first lighting device 1 and the second lighting device 2 in this case. The horizontal axis and the markers illustrated in FIG. 12 are similar to the horizontal axis and the markers illustrated in FIG. 5. In a case where the vehicle height of the vehicle 23 calculated in step S12 is equal to or larger than a preset threshold, it can be said that the vehicle 23 is a vehicle having a large vehicle height. Accordingly, since the control unit 14 causes only the second lighting device 2 to emit light in each frame and does not cause the first lighting device 1 to emit light, the imaging device 3 can generate images that favorably show the state in the vehicle seen through a window by imaging. Moreover, reflected glare of light due to the second lighting device 2 does not occur. Accordingly, since the control unit 14 controls the first lighting device 1 and the second lighting device 2 as described above, images that favorably show the state in the vehicle seen through a window without reflected glare of light can be acquired as a result of imaging a vehicle having a large vehicle height by the imaging device 3.

In other words, the control unit 14 controls the first lighting device 1 and the second lighting device 2 to emit light in a preset manner depending on the vehicle height of the vehicle 23 while the imaging device 3 is imaging the vehicle 23 over a plurality of frames. In a case where the vehicle height of the vehicle 23 is smaller than a preset threshold, the control unit 14 controls the first lighting device 1 and the second lighting device 2 in a manner such that the first lighting device 1 irradiates the vehicle 23 with light and the second lighting device 2 does not irradiate the vehicle 23 with light. In a case where the vehicle height of the vehicle 23 is equal to or larger than a preset threshold, the control unit 14 controls the first lighting device 1 and the second lighting device 2 in a manner such that the second lighting device 2 irradiates the vehicle 23 with light and the first lighting device 1 does not irradiate the vehicle 23 with light.

It is to be noted that the control unit 14 may cause both of the first lighting device 1 and the second lighting device 2 to emit light in a case where the vehicle height of the vehicle 23 is equal to or larger than a preset threshold. This is because reflected glare of light due to the first lighting device 1 does not occur when the vehicle height is large.

After step S13, the imaging device 3 transmits the images acquired by imaging in step S13 to the detector 8 (step S14). For example, the imaging device 3 may transmit each image to the detector 8 via the control unit 14. In other words, the imaging device 3 may transmit each image generated in step S13 to the control unit 14, and the control unit 14 may transmit each image to the detector 8.

It is to be noted that the detector 8 detects the state in the vehicle on the basis of the images transmitted from the imaging device 3. For example, the detector 8 detects the position of a person in the image. However, as described in the first exemplary embodiment, the detection target of the detector 8 may not be the position of a person.

In the above example, the control unit 14 causes only the first lighting device 1 to emit light in each frame and does not cause the second lighting device 2 to emit light in a case where the calculated vehicle height of the vehicle 23 is smaller than a preset threshold. In a case where the calculated vehicle height of the vehicle 23 is equal to or larger than a preset threshold, the control unit 14 causes only the second lighting device 2 to emit light in each frame and does not cause the first lighting device 1 to emit light. Accordingly, as described above, images that favorably show the state in the vehicle seen through a window without reflected glare of light are acquired regardless of whether the vehicle 23 is a vehicle having a large vehicle height or a vehicle having a small vehicle height.

In the above step S13, a case in which the control unit 14 controls the first lighting device 1 and the second lighting device 2 depending on the calculated vehicle height of the vehicle 23 has been described.

In step S13, the control unit 14 may control the first lighting device 1 and the second lighting device 2 depending on the calculated vehicle height of the vehicle 23 and the distance to the vehicle 23. Hereinafter, an example in which the control unit 14 controls the first lighting device 1 and the second lighting device 2 depending on the calculated vehicle height of the vehicle 23 and the distance to the vehicle 23 will be specifically described. Although FIG. 8 is referred to in the following description, FIG. 8 is described in the first exemplary embodiment, and therefore the description will be omitted here.

The control unit 14 uses the calculated vehicle height of the vehicle 23 and the distance to the vehicle 23 to determine coordinates represented by (Distance to Vehicle, Vehicle Height). In a case where coordinates represented by (Distance to Vehicle, Vehicle Height) are within an area of a triangle (see FIG. 8) having vertices at coordinates (0, 0), (a, 0), and (0, b), the control unit 14 causes only the first lighting device 1 to emit light in each frame and does not cause the second lighting device 2 to emit light. The light emission patterns of the first lighting device 1 and the second lighting device 2 in this case are similar to the emission patterns schematically illustrated in FIG. 11. The fact that coordinates represented by (Distance to Vehicle, Vehicle Height) are within the above triangular area means that reflected glare of light due to the second lighting device 2 occurs in images acquired by imaging the vehicle. As described above, since the control unit 14 causes only the first lighting device 1 to emit light in each frame and does not cause the second lighting device 2 to emit light, occurrence of such reflected glare of light due to the second lighting device 2 is prevented. Moreover, the fact that coordinates represented by (Distance to Vehicle, Vehicle Height) are within the above triangular area means that the vehicle height is equal to or smaller than b. Accordingly, it can be said that the passing vehicle is a vehicle having a small vehicle height. Thus, the imaging device 3 can generate images that favorably show the state in the vehicle seen through a window without reflected glare of image light even in a case where only the first lighting device 1 is caused to emit light.

Figure 13:
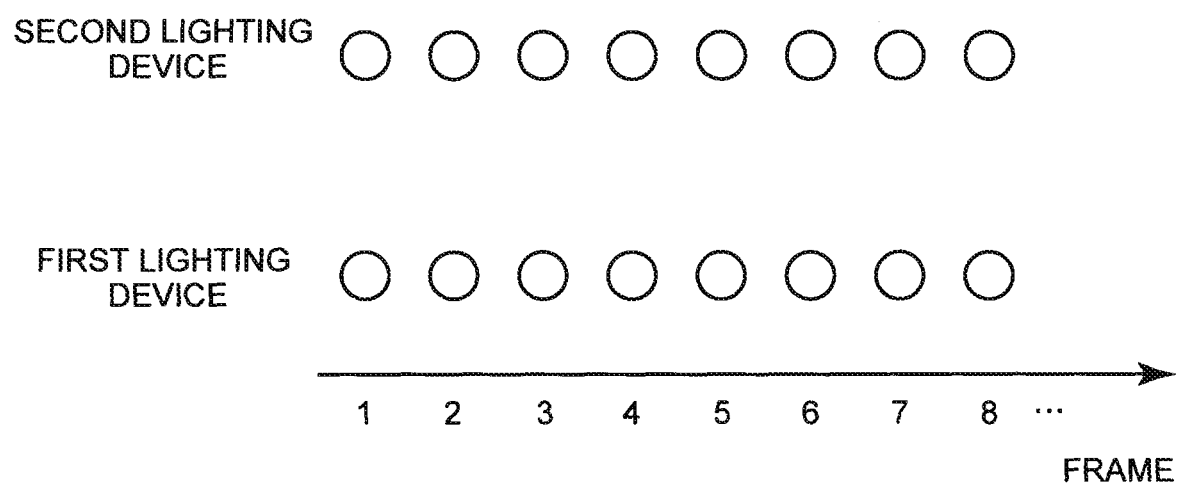
FIG. 13 It depicts a schematic diagram illustrating an example of light irradiation patterns of the first lighting device and the second lighting device in the second exemplary embodiment.

In a case where coordinates represented by (Distance to Vehicle, Vehicle Height) are out of an area of a triangle (see FIG. 8) having vertices at coordinates (0, 0), (a, 0), and (0, b), the control unit 14 causes both of the first lighting device 1 and the second lighting device 2 to emit light in each frame. FIG. 13 is a schematic diagram illustrating light emission patterns of the first lighting device 1 and the second lighting device 2 in this case. The horizontal axis and the markers illustrated in FIG. 13 are similar to the horizontal axis and the markers illustrated in FIG. 5. Assume that the passing vehicle is a vehicle having a small vehicle height. Even in this case, since coordinates represented by (Distance to Vehicle, Vehicle Height) are out of the above triangular area, the distance to the vehicle is long, and reflected glare of light does not occur even when the second lighting device 2 emits light. Moreover, the first lighting device 1 emits light in each flame. Accordingly, images generated by the imaging device 3 are images that favorably show the state in the vehicle seen through a window without reflected glare of image light. Moreover, assume that the passing vehicle is a vehicle having a large vehicle height. In this case, reflected glare of light does not occur even when the first lighting device 1 emits light. Moreover, the second lighting device 2 emits light in each flame. Accordingly, images generated by the imaging device 3 are images that favorably show the state in the vehicle seen through a window without reflected glare of light. Accordingly, images that favorably show the state in the vehicle seen through a window without reflected glare of light are acquired regardless of the vehicle height.

The above operation of the control unit 14 is collectively described as follows. The control unit 14 causes only the first lighting device 1 to emit light in each frame and does not cause the second lighting device 2 to emit light in a case where coordinates represented by (Distance to Vehicle, Vehicle Height) are within the above triangular area, or causes both of the first lighting device 1 and the second lighting device 2 to emit light in each frame in a case where the coordinates are out of the above triangular area. Even when the control unit 14 performs control in this manner, images that favorably show the state in the vehicle seen through a window without reflected glare of light are acquired regardless of the height of the passing mobile object as described above.

In the example described herein, it can be said that the control unit 14 causes only the first lighting device 1 to emit light in each frame in a case where the combination of the distance to the vehicle and the vehicle height satisfies a predetermine condition (a condition that coordinates represented by (Distance to Vehicle, Vehicle Height) is within the above-described triangular area), or causes both of the first lighting device 1 and the second lighting device 2 to emit light in each frame in a case where the combination does not satisfy the predetermined condition.

In other words, while the imaging device 3 is imaging the vehicle 23 over a plurality of frames, the control unit 14 controls the first lighting device 1 and the second lighting device 2 to emit light in a preset manner depending on the combination of the vehicle height of the vehicle 23 and the distance to the vehicle 23. In a case where the combination of the distance to the vehicle 23 and the vehicle height satisfies the predetermined condition, the control unit 14 controls the first lighting device and the second lighting device 2 in a manner such that the first lighting device 1 irradiates the vehicle 23 with light and the second lighting device 2 does not irradiate the vehicle 23 with light. In a case here the combination of the distance to the vehicle 23 and the vehicle height does not satisfy the predetermined condition, the control unit 14 control the first lighting device and the second lighting device 2 in a manner such that both of the first lighting device 1 and the second lighting device 2 irradiate the vehicle 23 with light.

In a case where coordinates represented by (Distance to Vehicle, Vehicle Height) are out of an area of a triangle (see FIG. 8) having vertices at the coordinates (0, 0), (a, 0), and (0, b), the control unit 14 may cause the first lighting device 1 and the second lighting device 2 to emit light alternately every frame.

Figure 14:
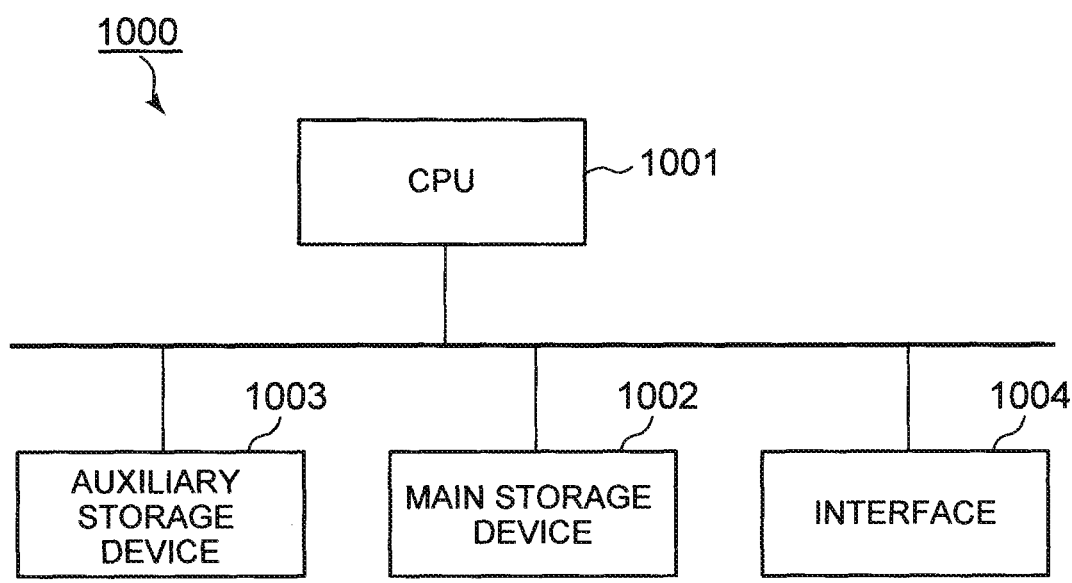
FIG. 14 It depicts a schematic block diagram illustrating a configuration example of a computer according to each exemplary embodiment of the present invention.

FIG. 14 is a schematic block diagram illustrating an example of the configuration of a computer (computers 7 and 17) according to each exemplary embodiment of the present invention. The computer 1000 is provided with a CPU 1001, a main storage device 1002, an auxiliary storage device 1003, and an interface 1004.

The computer (computers 7 and 17) illustrated in each exemplary embodiment of the present invention is, for example, a computer 1000 illustrated in FIG. 14. The operation of the computer illustrated in each exemplary embodiment of the present invention is stored in the auxiliary storage device 1003 in the form of a program. The CPU 1001 reads a program from the auxiliary storage device 1003 and develops the program in the main storage device 1002, and executes the above processing according to the program.

The auxiliary storage device 1003 is an example of a non-transitory tangible medium. Other examples of non-transitory tangible media include magnetic disks connected via an interface 1004, magneto-optical disks, Compact Disk Read Only Memories (CD-ROMs), Digital Versatile Disk Read Only Memories (DVD-ROMs), semiconductor memories, and the like. In a case where this program is distributed to the computer 1000 through a communication line, the computer 1000 that has received the distribution may develop the program in the main storage device 1002 and execute the above processing.

Figure 15:
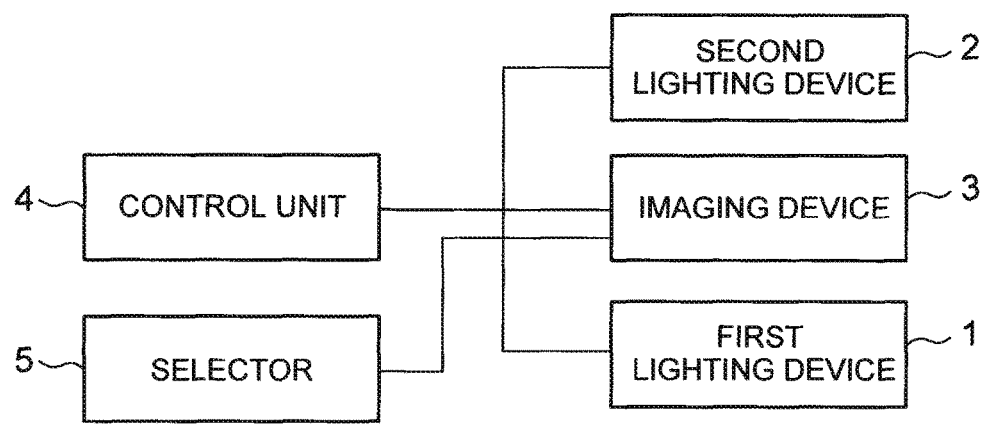
FIG. 15 It depicts a block diagram illustrating an outline of an imaging system of the present invention.

Next, an outline of the present invention will be described. FIG. 15 is a block diagram illustrating an outline of an imaging system of the present invention. The imaging system of the present invention is provided with an imaging device 3, a first lighting device 1, a second lighting device 2, a control unit 4, and a selector 5.

The imaging device 3 images a mobile object.

The first lighting device 1 irradiates the mobile object with light.

The second lighting device 2 is installed at a position higher than the first lighting device 1 and irradiates the mobile object with light.

The control unit 4 causes the first lighting device 1 and the second lighting device 2 to emit light in respective patterns while the imaging device 3 is imaging a mobile object over a plurality of frames.

The selector 5 selects images acquired by imaging a mobile object irradiated with light in a preset manner depending on the height of the mobile object from among images for a plurality of frames.

It is possible with such a configuration to acquire images that favorably show the situation in the mobile object seen through a window regardless of the height of the passing mobile object.

Figure 16:
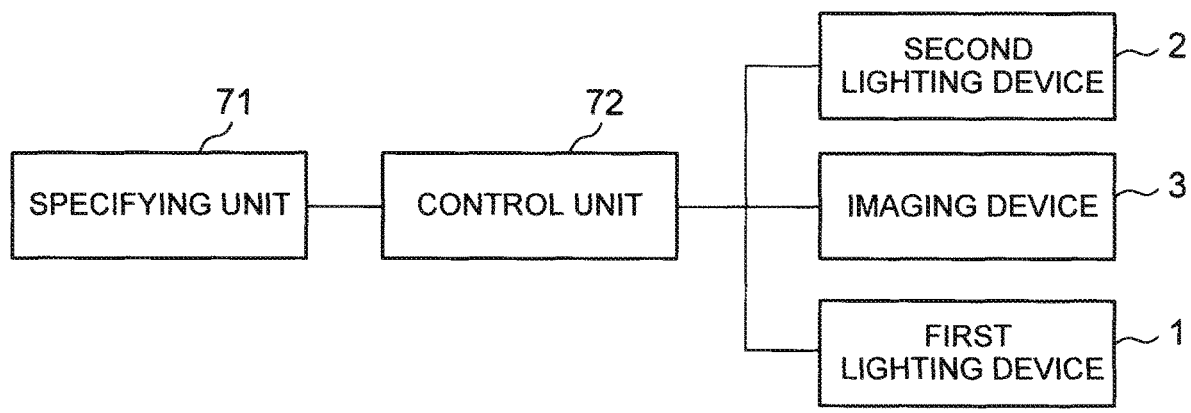
FIG. 16 It depicts a block diagram illustrating another example of an outline of an imaging system of the present invention.
Figure 17:
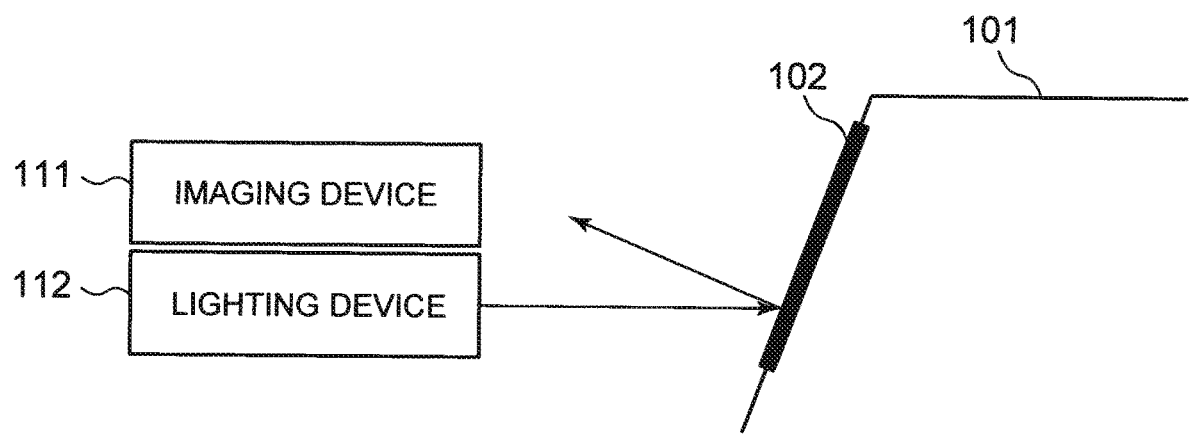
FIG. 17 It depicts a schematic diagram illustrating a situation in which reflected glare of light occurs since the imaging device and the lighting device are close to each other.

FIG. 16 is a block diagram illustrating another example of an outline of an imaging system of the present invention. The imaging system illustrated in FIG. 16 is provided with an imaging device 3, a first lighting device 1, a second lighting device 2, a specifying unit 71, and a control unit 72.

The imaging device 3, the first lighting device 1, and the second lighting device 2 are similar to the imaging device 3, the first lighting device 1, and the second lighting device 2 illustrated in FIG. 15.

The specifying unit 71 (e.g., the control unit 14) specifies the height of the mobile object on the basis of a signal from a sensor (e.g., the sensor 6) for detecting the mobile object before the imaging device 3 starts imaging the mobile object.

The control unit 72 (e.g., the control unit 14) controls the first lighting device 1 and the second lighting device 2 to emit light in a preset manner depending on the specified height while the imaging device 3 is imaging a mobile object over a plurality of frames.

It is possible with such a configuration to acquire images that favorably show the situation in the mobile object seen through a window regardless of the height of the passing mobile object.

The above exemplary embodiments of the present invention may also be described as, but not limited to, the following supplementary notes.

(Supplementary Note 1)

An imaging system including:

an imaging device that images a mobile object;

a first lighting device that irradiates the mobile object with light;

a second lighting device that is installed at a position higher than the first lighting device and irradiates the mobile object with light;

a control unit that causes the first lighting device and the second lighting device to emit light in respective patterns while the imaging device is imaging the mobile object over a plurality of frames; and a selector that selects images acquired by imaging a mobile object irradiated with light in a preset manner depending on a height of the mobile object from among images for the plurality of frames.

(Supplementary Note 2)

The imaging system according to Supplementary note 1, in which the control unit synchronizes imaging of the mobile object by the imaging device and light emission by at least one of the first lighting device and the second lighting device with each other in each frame.

(Supplementary Note 3)

The imaging system according to Supplementary note 1 or 2, in which the imaging device is installed at a height of a vicinity of a center of a window at a side surface of a mobile object assumed to be a mobile object having a small height, the first lighting device is installed at a height of a vicinity of a bottom of a window at a side surface of a mobile object assumed to be a mobile object having a small height, and the second lighting device is installed at a height of a vicinity of a bottom of a window at a side surface of a mobile object assumed to be a mobile object having a large height.

(Supplementary Note 4)

The imaging system according to any one of Supplementary notes 1 to 3, in which the control unit causes the first lighting device and the second lighting device to emit light alternately every frame, and the selector selects images acquired by imaging the mobile object irradiated with light from the first lighting device in a case where a height of the mobile object is smaller than a preset threshold, or selects images acquired by imaging the mobile object irradiated with light from the second lighting device in a case where the height of the mobile object is equal to or larger than the threshold.

(Supplementary Note 4a)

The imaging system according to any one of Supplementary notes 1 to 3, in which the control unit causes the first lighting device and the second lighting device to emit light alternately every frame, and the selector selects images generated from imaging by the imaging device while the first lighting device is emitting light in a case where a height of the mobile object is smaller than a preset threshold, or selects images generated from imaging by the imaging device while the second lighting device is emitting light in a case where the height of the mobile object is equal to or larger than the threshold.

(Supplementary Note 5)

The imaging system according to any one of Supplementary notes 1 to 3, in which the control unit causes the first lighting device to emit light in each frame and causes the second lighting device to emit light every other frame, and the selector selects images acquired by imaging the mobile object, which is irradiated with light from the first lighting device and is not irradiated with light from the second irradiation device, in a case where a combination of a height of the mobile object and a distance to the mobile object satisfies a predetermined condition, or selects images acquired by imaging the mobile object, which is irradiated with light from both of the first lighting device and the second lighting device, in a case where the combination of the height of the mobile object and the distance to the mobile object does not satisfy the predetermined condition.

(Supplementary Note 5a)

The imaging system according to any one of Supplementary notes 1 to 3, in which the control unit causes the first lighting device to emit light in each frame and causes the second lighting device to emit light every other frame, and the selector selects images generated from imaging by the imaging device while only the first lighting device is emitting light in a case where a combination of a height of the mobile object and a distance to the mobile object satisfies a predetermined condition, or selects images generated from imaging by the imaging device while both of the first lighting device and the second lighting device are emitting light in a case where the combination of the height of the mobile object and the distance to the mobile object does not satisfy the predetermined condition.

(Supplementary Note 6)

An imaging system including:

an imaging device that images a mobile object;

a first lighting device that irradiates the mobile object with light;

a second lighting device that is installed at a position higher than the first lighting device and irradiates the mobile object with light;

a specifying unit that specifies a height of the mobile object on the basis of a signal from a sensor for detecting the mobile object before the imaging device starts imaging the mobile object; and a control unit that controls the first lighting device and the second lighting device to emit light in a preset manner depending on the specified height while the imaging device is imaging the mobile object over a plurality of frames.

(Supplementary Note 7)

The imaging system according to Supplementary note 6, in which the imaging device is installed at a height of a vicinity of a center of a window at a side surface of a mobile object assumed to be a mobile object having a small height, the first lighting device is installed at a height of a vicinity of a bottom of a window at a side surface of a mobile object assumed to be a mobile object having a small height, and the second lighting device is installed at a height of a vicinity of a bottom of a window at a side surface of a mobile object assumed to be a mobile object having a large height.

(Supplementary Note 8)

The imaging system according to Supplementary note 6 or 7, in which the control unit causes only the first lighting device to emit light in a case where the specified height is smaller than a preset threshold, or causes only the second lighting device to emit light in a case where the specified height is equal to or larger than the threshold.

(Supplementary Note 9)

The imaging system according to Supplementary note 6 or 7, in which the control unit causes the first lighting device to emit light and does not cause the second irradiation device to emit light in a case where a combination of the specified height and the distance to the mobile object satisfies a predetermined condition, or causes both of the first lighting device and the second lighting device to emit light in a case where the combination of the specified height and the distance does not satisfy the predetermined condition.

(Supplementary Note 10)

An imaging method using an imaging device that images a mobile object, a first lighting device that irradiates the mobile object with light, and a second lighting device that is installed at a position higher than the first lighting device and irradiates the mobile object with light, the imaging method, by a computer, including:

causing the first lighting device and the second lighting device to emit light in respective patterns while the imaging device is imaging the mobile object over a plurality of frames; and selecting images acquired by imaging a mobile object irradiated with light in a preset manner depending on a height of the mobile object from among images for the plurality of frames.

(Supplementary Note 11)

An imaging method using an imaging device that images a mobile object, a first lighting device that irradiates the mobile object with light, and a second lighting device that is installed at a position higher than the first irradiation device and irradiates the mobile object with light, the imaging method, by a computer, including:

specifying a height of the mobile object on the basis of a signal from a sensor for detecting the mobile object before the imaging device starts imaging the mobile object; and controlling the first lighting device and the second lighting device to emit light in a preset manner depending on the specified height while the imaging device is imaging the mobile object over a plurality of frames.

(Supplementary Note 12)

An imaging control program which is mounted in a computer connected with an imaging device that images a mobile object, with a first lighting device that irradiates the mobile object with light, and with a second lighting device that is installed at a position higher than the first lighting device and irradiates the mobile object with light, the imaging control program causing the computer to execute:

a control process of causing the first lighting device and the second lighting device to emit light in respective patterns while the imaging device is imaging the mobile object over a plurality of frames; and a selection process of selecting images acquired by imaging a mobile object irradiated with light in a preset manner depending on a height of the mobile object from among images for the plurality of frames. [0147]

(Supplementary Note 13)

An imaging control program which is mounted in a computer connected with an imaging device that images a mobile object, with a first lighting device that irradiates the mobile object with light, and with a second lighting device that is installed at a position higher than the first lighting device and irradiates the mobile object with light, the imaging control program causing the computer to execute:

a specifying process of specifying a height of the mobile object on the basis of a signal from a sensor for detecting the mobile object before the imaging device starts imaging the mobile object; and a control process of controlling the first lighting device and the second lighting device to emit light in a preset manner depending on the specified height while the imaging device is imaging the mobile object over a plurality of frames.

Although the present invention has been described above with reference to the exemplary embodiments, the present invention is not limited to the above exemplary embodiments. The configurations or details of the present invention can be modified in various ways that can be understood by those skilled in the art within the scope of the present invention.

This application claims priority based on Japanese Patent Application No. 2017-066567 filed on Mar. 30, 2017, the entire disclosure of which is incorporated herein.

INDUSTRIAL APPLICABILITY

The present invention is suitably applicable to an imaging system that images a mobile object having a window at a side surface.

REFERENCE SIGNS LIST

1 First lighting device
2 Second lighting device
3 Imaging device
4, 14 Control unit
5 Selector
6 Sensor

The invention claimed is:

1. An imaging system comprising:
a camera that images a mobile object;
a first lighting equipment that irradiates the mobile object with light;
a second lighting equipment that is installed at a position higher than the first lighting equipment and irradiates the mobile object with light;
at least one processor configured to:
cause the first lighting equipment and the second lighting equipment to emit light in respective patterns while the camera is imaging the mobile object over a plurality of frames;
select images acquired by imaging a mobile object irradiated with light in a preset manner depending on a height of the mobile object from among images for the plurality of frames,
cause the first lighting equipment and the second lighting equipment to emit light alternately every frame,
select images acquired by imaging the mobile object irradiated with light from the first lighting equipment in a case where a height of the mobile object is smaller than a preset threshold, and
select images acquired by imaging the mobile object irradiated with light from the second lighting equipment in a case where the height of the mobile object is equal to or larger than the threshold.

2. The imaging system according to claim 1,
wherein the at least one processor is further configured to synchronize imaging of the mobile object by the camera and light emission by at least one of the first lighting equipment and the second lighting equipment with each other in each frame.

3. The imaging system according to claim 1,
wherein the camera is installed at a height of a vicinity of a center of a window at a side surface of a mobile object assumed to be a mobile object having a small height,
the first lighting equipment is installed at a height of a vicinity of a bottom of a window at a side surface of a mobile object assumed to be a mobile object having a small height, and
the second lighting equipment is installed at a height of a vicinity of a bottom of a window at a side surface of a mobile object assumed to be a mobile object having a large height.

4. An imaging method using a camera that images a mobile object, a first lighting equipment that irradiates the mobile object with light, and a second lighting equipment that is installed at a position higher than the first lighting equipment and irradiates the mobile object with light, the imaging method, by a computer, comprising:

causing the first lighting equipment and the second lighting equipment to emit light in respective patterns while the camera is imaging the mobile object over a plurality of frames;

selecting images acquired by imaging a mobile object irradiated with light in a preset manner depending on a height of the mobile object from among images for the plurality of frames, causing the first lighting equipment and the second lighting equipment to emit light alternately every frame, selecting images acquired by imaging the mobile object irradiated with light from the first lighting equipment in a case where a height of the mobile object is smaller than a preset threshold, and selecting images acquired by imaging the mobile object irradiated with light from the second lighting equipment in a case where the height of the mobile object is equal to or larger than the threshold.

5. A non-transitory computer-readable recording medium in which an imaging control program is recorded, the imaging control program which is mounted in a computer connected with a camera that images a mobile object, with a first lighting equipment that irradiates the mobile object with light, and with a second lighting equipment that is installed at a position higher than the first lighting equipment and irradiates the mobile object with light, the imaging control program causing the computer to execute:

a control process of causing the first lighting equipment and the second lighting equipment to emit light in respective patterns while the camera is imaging the mobile object over a plurality of frames;

a selection process of selecting images acquired by imaging a mobile object irradiated with light in a preset manner depending on a height of the mobile object from among images for the plurality of frames, in the control process, causing the first lighting equipment and the second lighting equipment to emit light alternately every frame, and in the selection process, selecting images acquired by imaging the mobile object irradiated with light from the first lighting equipment in a case where a height of the mobile object is smaller than a preset threshold, and selecting images acquired by imaging the mobile object irradiated with light from the second lighting equipment in a case where the height of the mobile object is equal to or larger than the threshold.

* * * * *